(12) United States Patent
Francis

(10) Patent No.: US 12,280,720 B2
(45) Date of Patent: Apr. 22, 2025

(54) ADJUSTABLE CARGO ORGANIZER THAT CAN BE REMOVABLY SECURED TO AN EXTERNAL PORTION OF A VEHICLE OR TO A STRUCTURE, AND METHODS

(71) Applicant: William S Francis, Pensacola, FL (US)

(72) Inventor: William S Francis, Pensacola, FL (US)

( * ) Notice: Subject to any disclaimer, the term of this patent is extended or adjusted under 35 U.S.C. 154(b) by 165 days.

(21) Appl. No.: 18/316,328

(22) Filed: May 12, 2023

(65) Prior Publication Data
US 2023/0365071 A1 Nov. 16, 2023

Related U.S. Application Data

(60) Provisional application No. 63/341,590, filed on May 13, 2022.

(51) Int. Cl.
*B60R 7/02* (2006.01)
*B60R 11/00* (2006.01)

(52) U.S. Cl.
CPC ............... *B60R 11/00* (2013.01); *B60R 7/02* (2013.01)

(58) Field of Classification Search
CPC ........................................................ B60R 7/02
USPC ....... 224/403, 311, 539, 542, 543, 551, 407, 224/409; 211/105.3, 105.6; D12/426; 410/118
See application file for complete search history.

(56) References Cited

U.S. PATENT DOCUMENTS

| | | | | |
|---|---|---|---|---|
| 3,967,666 A | * | 7/1976 | Farrar | A61G 7/0503 383/7 |
| 4,824,302 A | * | 4/1989 | Schultheis | B60P 7/15 410/151 |
| 4,830,238 A | * | 5/1989 | Widinski | B62B 9/26 224/563 |
| 4,834,599 A | * | 5/1989 | Gordon | B60P 7/15 410/151 |
| 4,874,028 A | * | 10/1989 | Lynch | A47H 99/00 160/332 |
| 4,917,429 A | * | 4/1990 | Giger | B62D 33/02 224/543 |
| 5,012,963 A | * | 5/1991 | Rosenbaum | A61H 3/00 224/407 |
| 5,259,497 A | * | 11/1993 | Brothers | A45D 8/185 211/13.1 |
| D353,501 S | * | 12/1994 | Kral | D6/567 |
| 5,370,246 A | * | 12/1994 | Traynor | A61G 7/0503 5/503.1 |
| 5,427,230 A | * | 6/1995 | Mattox | A45C 11/16 206/478 |

(Continued)

*Primary Examiner* — Justin M Larson
(74) *Attorney, Agent, or Firm* — SMITH TEMPEL; Steven P. Wigmore

(57) ABSTRACT

An adjustable cargo organizer comprises a main panel having at least first and second suspension rod channels formed therein for insertion of suspension rods. The main panel has a plurality of cargo compartments formed therein or secured thereto for holding and storing items. The suspension rods span the length of the respective channels such that ends of the suspension rods extend beyond the ends of the channels to form rigid upper and lower supports for the main panel. Preferably the suspension rods are adjustable in length to provide the adjustable cargo organizers with different widths for accommodating different distances between the structures or parts of the vehicle to which the ends of the suspension rods removably couple.

18 Claims, 7 Drawing Sheets

(56) References Cited

U.S. PATENT DOCUMENTS

| | | | | |
|---|---|---|---|---|
| 5,427,288 A * | 6/1995 | Trubee | | B60R 7/02 224/567 |
| 5,427,486 A * | 6/1995 | Green | | B60P 7/14 410/151 |
| 5,513,789 A * | 5/1996 | Woods | | A61H 3/02 224/407 |
| 5,526,972 A * | 6/1996 | Frazier | | B60R 9/00 220/531 |
| 5,628,442 A * | 5/1997 | Wayne | | B60R 7/005 224/543 |
| 5,713,502 A * | 2/1998 | Dixon | | B60R 7/02 211/12 |
| 5,743,650 A * | 4/1998 | Shannon | | A61G 5/10 604/326 |
| 5,769,293 A * | 6/1998 | Zaretsky | | B60R 7/02 410/151 |
| 6,041,987 A * | 3/2000 | Tickoo | | B60R 7/02 220/8 |
| 6,062,452 A * | 5/2000 | Kauskey | | B60R 7/02 224/403 |
| 6,109,847 A * | 8/2000 | Patel | | B60R 7/02 410/94 |
| 6,371,342 B2 * | 4/2002 | Larsen | | B60R 7/04 224/311 |
| 6,651,831 B2 | 11/2003 | Samelson | | |
| D485,227 S * | 1/2004 | Graham | | D12/426 |
| 7,000,810 B1 * | 2/2006 | Farmer | | B60R 11/06 224/543 |
| 7,044,348 B2 * | 5/2006 | McKenzie | | B60R 7/02 224/539 |
| D552,533 S * | 10/2007 | Cord | | D12/422 |
| D556,486 S * | 12/2007 | Boutin | | D6/567 |
| 7,665,790 B2 * | 2/2010 | Oino | | B60R 7/02 296/37.16 |
| 7,748,584 B2 * | 7/2010 | Easom | | B25H 3/00 224/563 |
| 7,984,724 B1 * | 7/2011 | Eberle | | A61H 3/04 224/407 |
| 8,215,501 B2 | 7/2012 | Trettin et al. | | |
| 8,479,932 B2 * | 7/2013 | Carney | | A47H 1/022 403/109.5 |
| D689,282 S * | 9/2013 | Lindeman | | D3/231 |
| 8,701,952 B1 * | 4/2014 | Tripp | | B60R 11/06 224/543 |
| 8,740,525 B2 * | 6/2014 | Coury | | B60P 7/06 410/118 |
| 9,815,411 B2 * | 11/2017 | Young | | B65D 25/04 |
| D816,339 S * | 5/2018 | Giamanco | | D3/315 |
| 10,024,347 B2 | 7/2018 | Bertrand et al. | | |
| 10,426,287 B1 | 10/2019 | Tsai | | |
| 10,436,235 B2 | 10/2019 | Daniels et al. | | |
| 10,568,421 B2 * | 2/2020 | Felsenthal | | A47G 29/087 |
| D944,718 S * | 3/2022 | Lee | | D12/426 |
| 11,382,447 B2 | 7/2022 | Berman et al. | | |
| D972,489 S * | 12/2022 | Ye | | D12/426 |
| 11,618,508 B2 * | 4/2023 | Dexter | | B62D 33/0207 224/404 |
| 2007/0119890 A1 * | 5/2007 | Cook | | B60R 7/00 224/543 |
| 2009/0250495 A1 * | 10/2009 | Sonnier | | B60R 11/06 224/543 |
| 2012/0152873 A1 | 6/2012 | Didehvar | | |
| 2012/0285914 A1 | 11/2012 | Carney | | |
| 2013/0256159 A1 * | 10/2013 | Walsh | | A47G 29/08 206/6.1 |

* cited by examiner

ADJUSTABLE CARGO ORGANIZER THAT CAN BE REMOVABLY SECURED TO AN EXTERNAL PORTION OF A VEHICLE OR TO A STRUCTURE, AND METHODS

CROSS-REFERENCE TO RELATED APPLICATIONS

The present application is a nonprovisional application that claims priority to a U.S. provisional application having Ser. No. 63/341,590, filed on May 13, 2022, entitled "AN ADJUSTABLE CARGO ORGANIZER THAT CAN BE REMOVABLY SECURED TO AN EXTERNAL PORTION OF A VEHICLE, AND METHODS," which is incorporated by reference herein.

TECHNICAL FIELD

This invention relates to the field of cargo organizers and devices for storing items in compact spaces.

BACKGROUND

Currently available cargo organizers include automotive seatback organizers and truck bed tool carriers. Automotive seatback organizers are designed to attach to seats with straps or hooks and hang from the seat providing pockets for storage. Truck bed organizers are either unattached boxes with compartments or handles that bear no attachment points to the vehicle itself. Other truck bed organizers use permanently affixed solid rods that span the truck bed horizontally and embody a series of netting compartments or bins made of fabric or plastic to hold tools or recreational equipment. Still other organizers utilize permanently-installed hardware to adjust and store cargo.

The drawbacks of current organizers include the following. Hanging organizers do not have a method to keep them in a stable position while stored items are being retrieved. Solid or rigid organizers are heavy, cumbersome and difficult to store in confined spaces. Many of the current truck bed organizers require permanently-installed hardware in order to facilitate the attachment of the organizer itself, which lowers the resale value of the vehicle. The specificity of design makes the current products difficult if not impossible to use in any capacity outside of the confines of the installed hardware; once they are installed in one place, they generally cannot be moved within the conveyance.

Currently available products cannot be used in conjunction with a vehicle bed cover because they have to be attached to the top of the bed rail, which would prevent closure of the bed cover. Other products cannot be affixed to structures within uneven side walls. If the upper wall of the vehicle is narrower than the same lower wall, then the solid rods will be too long to mount to the walls. Many products can only be used in the vertical or horizontal position exclusively. Still other products have no method for adjusting the position of the organizer after it is emplaced to prevent items from shifting during transit.

A need exists for an adjustable cargo organizer that overcomes the shortcomings of currently available cargo organizers.

SUMMARY

An adjustable cargo organizer is disclosed herein comprising a main panel, a plurality of cargo compartments formed in or secured to the main panel and first and second extension rods. The main panel has at least first and second suspension rod channels formed along first and second opposing sides of the main panel. The first and second channels are substantially parallel to one another and substantially parallel to the first and second sides of the main panel, respectively. The cargo compartments are sized and shaped to receive and temporarily hold one or more cargo items. The first and second suspension rods extend through the first and second channels, respectively, such that opposite ends of the suspension rods are disposed outside of opposite ends of the respective channels for removably coupling the first and second suspension rods to first and second portions of a vehicle or structure.

In accordance with another representative embodiment, the main panel has at least top and bottom suspension rod channels formed along top and bottom opposing sides, respectively, of the main panel. The top and bottom channels are substantially parallel to one another and substantially parallel to the top and bottom sides of the main panel, respectively. Top and bottom adjustable suspension rods extend through the top and bottom channels, respectively, such that opposite ends of the suspension rods are disposed outside of opposite ends of the respective channels for removably coupling the top and bottom suspension rods to first and second portions of a vehicle or structure. Each of the suspension rods being adjustable in length to accommodate different distances between the first and second portions of the vehicle or structure to which the ends of the rods removably couple.

These and other features and advantages will become apparent from the following description, drawings and claims.

BRIEF DESCRIPTION OF THE DRAWINGS

The representative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 4 illustrates a front plan view of the adjustable cargo organizer in accordance with a representative embodiment in which the organizer is designed for tailgates, picnics and the like.

DETAILED DESCRIPTION

Figure 1:
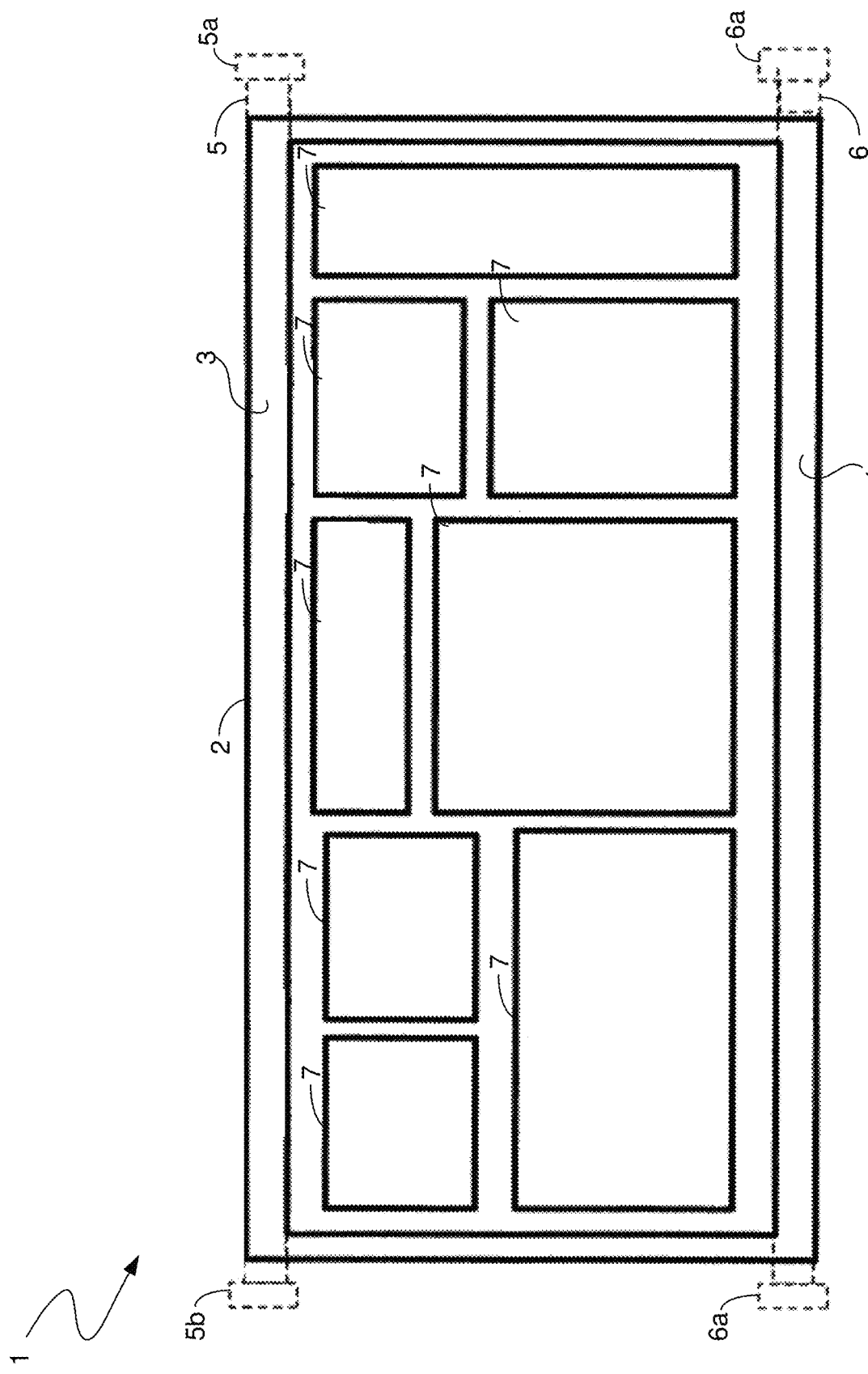
FIG. 1 illustrates a front plan view of the adjustable cargo organizer in accordance with a representative embodiment.

In the following detailed description, for purposes of explanation and not limitation, exemplary, or representative, embodiments disclosing specific details are set forth in order to provide a thorough understanding of the inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only and is not intended to be limiting. Any specifically-defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art.

Relative terms, such as "over," "above," "below," "top," "bottom," "front," "back," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

In accordance with a representative embodiment, the adjustable cargo organizer comprises a main panel, a plurality of cargo compartments secured to or formed in the main panel, and at least first and second suspension rods extending through at least first and second suspension rod channels formed along first and second opposing sides of the main panel, respectively. Each of the cargo compartments is sized and shaped to receive and temporarily hold one or more cargo items. The cargo compartments can be labeled to suggest the type of cargo items that the compartments are designed for, or suitable for, holding. At least two of the compartments have different shapes and sizes to make them suitable for holding items having different shapes and sizes. Each suspension rod has opposite ends that are disposed outside of opposite ends of the respective channel through which the respective rod extends that are adapted to be removably secured to opposite ends of a portion of a vehicle.

Figure 2:
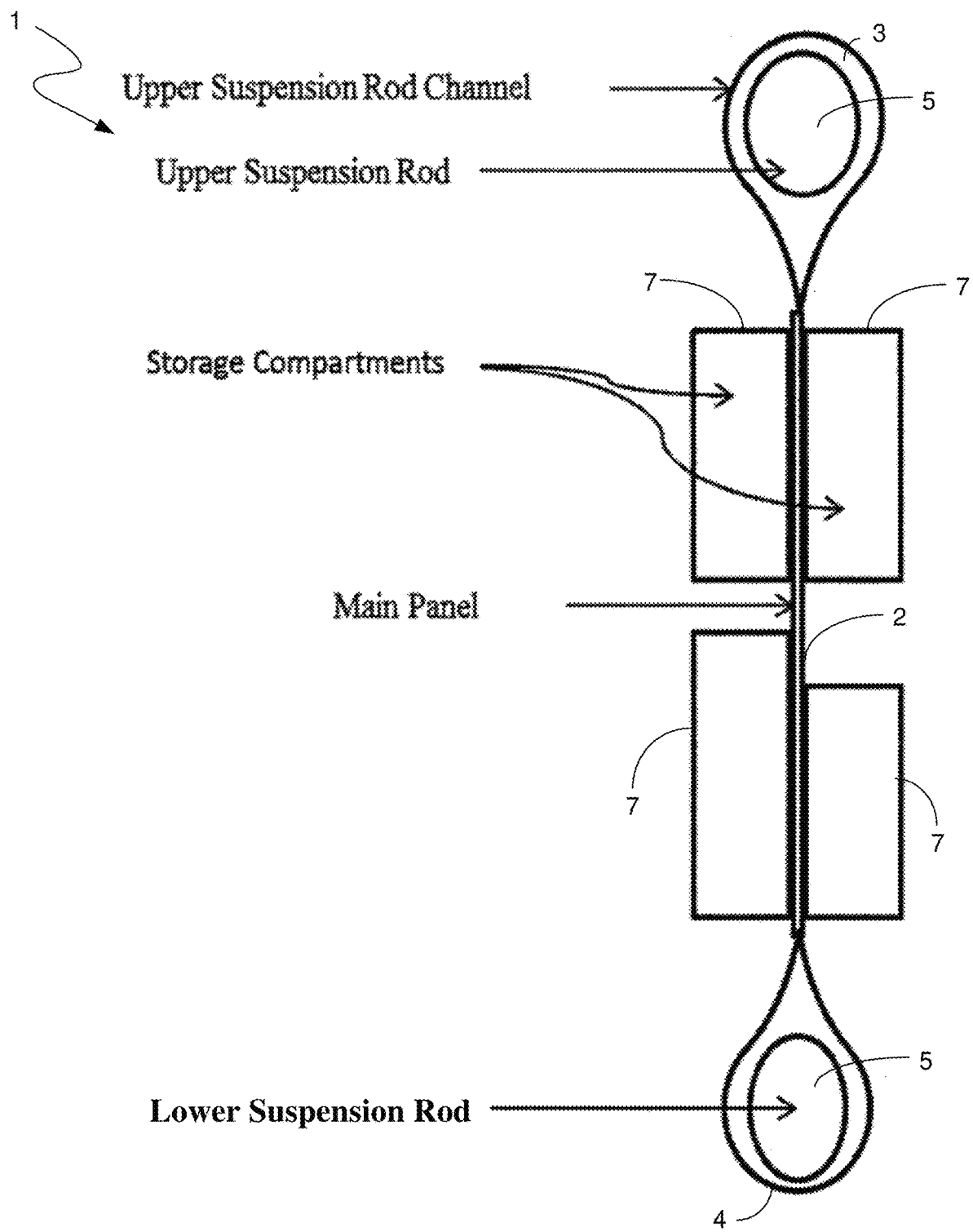
FIG. 2. illustrates a left side plan view of the adjustable cargo organizer shown in FIG. 1.
Figure 3:
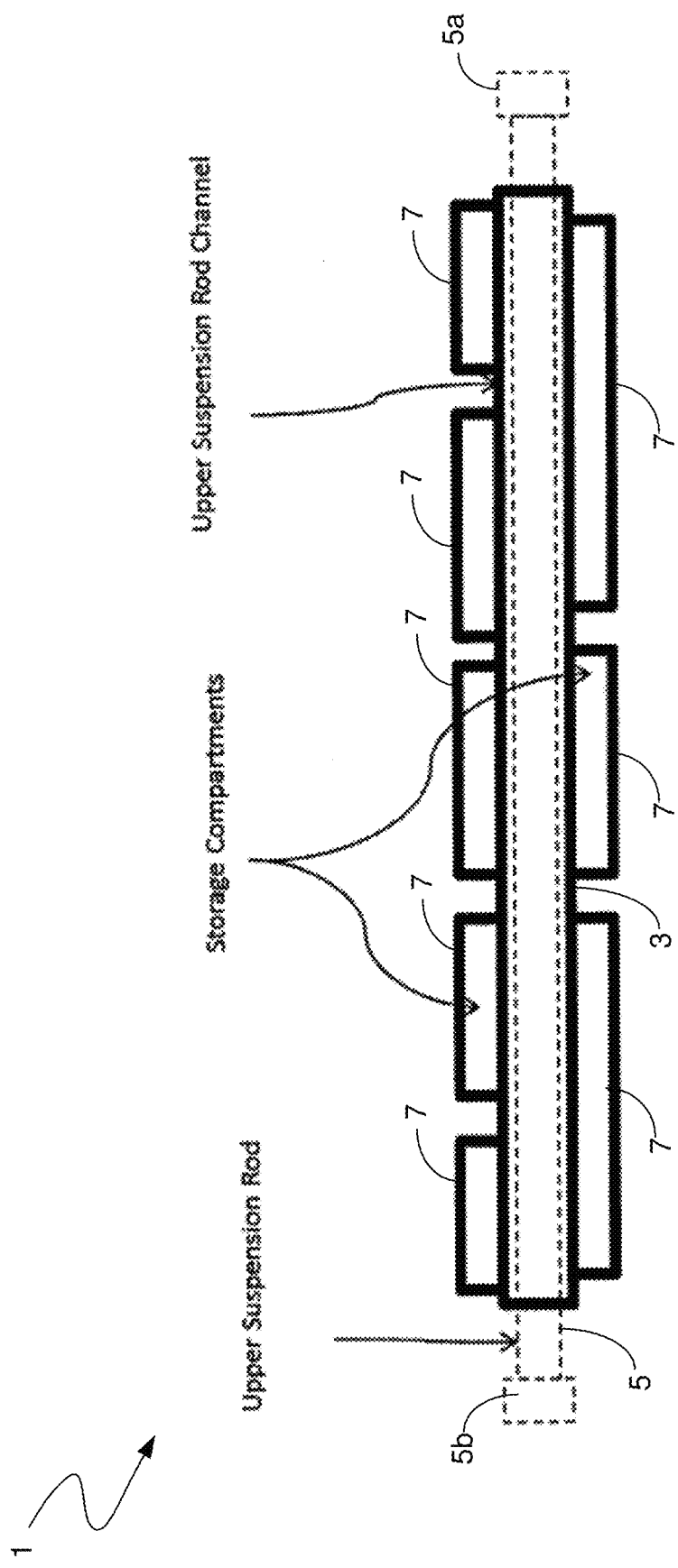
FIG. 3 illustrates a top plan view of the adjustable cargo organizer shown in FIGS. 1 and 2.

FIG. 1 illustrates a front plan view of the adjustable cargo organizer 1 in accordance with a representative embodiment. FIG. 2. illustrates a left side plan view of the adjustable cargo organizer 1 shown in FIG. 1. FIG. 3 illustrates a top plan view of the adjustable cargo organizer 1 shown in FIGS. 1 and 2. In accordance with this representative embodiment, the organizer 1 comprises a single panel 2 of flexible material and is generally rectangular in shape with a first, upper suspension rod channel 3 spanning the upper length of the main panel 2 along one side of the panel 2, and a second, lower suspension rod channel 4 spanning the lower length of the panel 2 along the opposite side of the panel 2, as shown in FIGS. 1-3.

The first and second channels 3 and 4, respectively, are used to allow the first, upper and second, lower suspension rods 5 and 6, respectively, to be removably coupled to the panel 2. The first, upper, suspension rod 5 is inserted through the first, upper suspension rod channel 3 until the rod 5 has substantially extended beyond each end of the first, upper suspension rod channel 3. This process is repeated with the second, lower suspension rod 6. When extended or contracted, the two rods 5, 6 can be adjusted in length to the user's desired length in order to exert outward force against a desired support surface of a vehicle, thereby making the upper and lower suspension rods substantially affixed between two opposing solid surfaces of the vehicle. The second, lower suspension rod 6 is adjusted in length in the same manner to the desired tension level.

Having placed both suspension rods 5, 6 into the extended positions, the user can then slide the upper and lower rods in a variety of directions to further adjust the suspension rods 5, 6, resulting in further adjustment of the main panel 2. The emplacement of the upper and lower suspension rods creates a semi-rigid wall of the material comprising the panel 2 that allows items in cargo compartments 7 to be stored and retrieved without undo effort. The cargo compartments 7 can be fixedly secured to the panel 2 (e.g., by stitching), integrally formed in the panel 2, or removably secured to the panel 2 (e.g., using hook-and-loop fasteners on the outer surfaces of the compartments 7 and on the outer surface of the panel). These compartments 7 can be affixed to either the front or rear side of the main panel 2. Other attachment mechanisms that can be used for this purpose include, for example, adhesives, heat adhering methods, hook-and-loop closures or other securing processes.

The cargo compartments 7 can have various sizes to meet the user's desired needs. The organizer 1 can also be used without the cargo compartments 7, or with the compartments being empty, in a vertical position (i.e., the panel 2 being substantially perpendicular to the plane of the Earth) to prevent items from shifting while in transit or in a horizontal position (i.e., the panel 2 being substantially parallel to the plane of the Earth) as a shelf, table or as a sun shading or rain shielding umbrella.

The organizer can be installed by sliding at least one suspension rod 5 through the upper suspension rod channel 3 and at least one suspension rod 6 through the lower suspension rod channel 4 until a substantially equal portion of each rod 5, 6 is extended beyond the edge of the suspension rod channel 3, 4. The user then estimates the required length needed to emplace the upper suspension rod 3 between the pre-designated anchor points on a vehicle exterior surface (e.g., a tailgate) or on opposing walls of some other structure and adjusts the suspension rods 5, 6 in length, as needed.

Having installed the two suspension rods 5, 6 to approximate length, the user may lift the entire main panel 2 with both suspension rods installed and begin to position the rods to the left or right for desired positioning. A variety of suspension rods a that are adjustable in length can be used as the rods 5, 6, as will be discussed below in more detail. The attached Appendix shows examples of suitable adjustable suspension rods. One suitable type of rod for this purpose is a spring-loaded rod having first and second rod sections that couple together coaxially and a compression spring that biases the ends of the rod sections outwardly in opposite coaxial directions. In such a case, while lifting the upper suspension rod 5, the user exerts inward pressure on the suspension rod sections so as to compress the rod 5 sufficiently to affix the rod 5 between the left and right mounting surfaces. The user then releases the inward counter pressure causing the outer ends 5a and 5b of the suspension rod 5 to affix between the opposing mounting surfaces. The same process is repeated with the lower suspension rod 6 in a similar manner until the outer ends 6a and 6b of the rod 6 are affixed. Some rods are adjusted in length by screwing or unscrewing the rod sections to cause the spring to be further compressed or decompressed. Other examples of suitable suspension rods can be found in, for example, U.S. Pat. Nos. 6,651,831, 11,382,447, 10,436,235, 10,426,287, 10,024,347, and 8,215,501, which are incorporated herein by reference.

After having emplaced both the upper and lower suspension rods 5 and 6, respectively, the user can then move the two rods 5, 6 in a sliding motion along the supporting surfaces to further align and adjust the organizer 1 until the panel 2 is substantially rigid. Once the organizer is in place, items can be added to the compartments 7 as desired. The removal process can be accomplished in reverse order. The entire organizer 1 can be stored by laying it on a flat surface and rolling it up until it is in a substantially tubular configuration for storage, with or without first removing the rods 5, 6 from the channels 3, 4, respectively.

The manner in which the organizer is manufactured can vary depending on the design of the organizer. One method uses a single sheet of material cut slightly longer than the desired final width of the main panel 2. This section of material is then folded over on itself from the top edge creating the upper suspension rod channel 3 by applying a horizontal stitch line from the top left corner ending at the top right corner edge. This stitch line should be a sufficient distance below the upper edge seam such that when the channel is complete there is enough room to slide the suspension rod 5 through the length of the channel without kinking or obstruction.

The same process is repeated for the lower suspension rod channel 4. This second stitch line should be a sufficient distance above the lower edge seam that when the channel 4 is complete there is enough room to slide the suspension rod 6 through the length of the channel 4 without kinking or obstruction.

Having completed the main panel section seam and upper and lower channel stitches, the cargo compartments 7 can then be sewn, adhered or otherwise attached, to a mounting surface of the main panel 2 (e.g., to the side of the panel that is intended to be easily accessed by users). The cargo compartments 7 can be created before or after the channels 3, 4 have been created. The mounting surfaces are the areas between the two inner stitch lines of the channels 3, 4 where compartments can be affixed without compromising or obstructing the upper and lower suspension rod channels. It should be noted that the inventive principles and concepts are not limited with reference to the manner in which the organizer 1 is manufactured.

Figure 4:
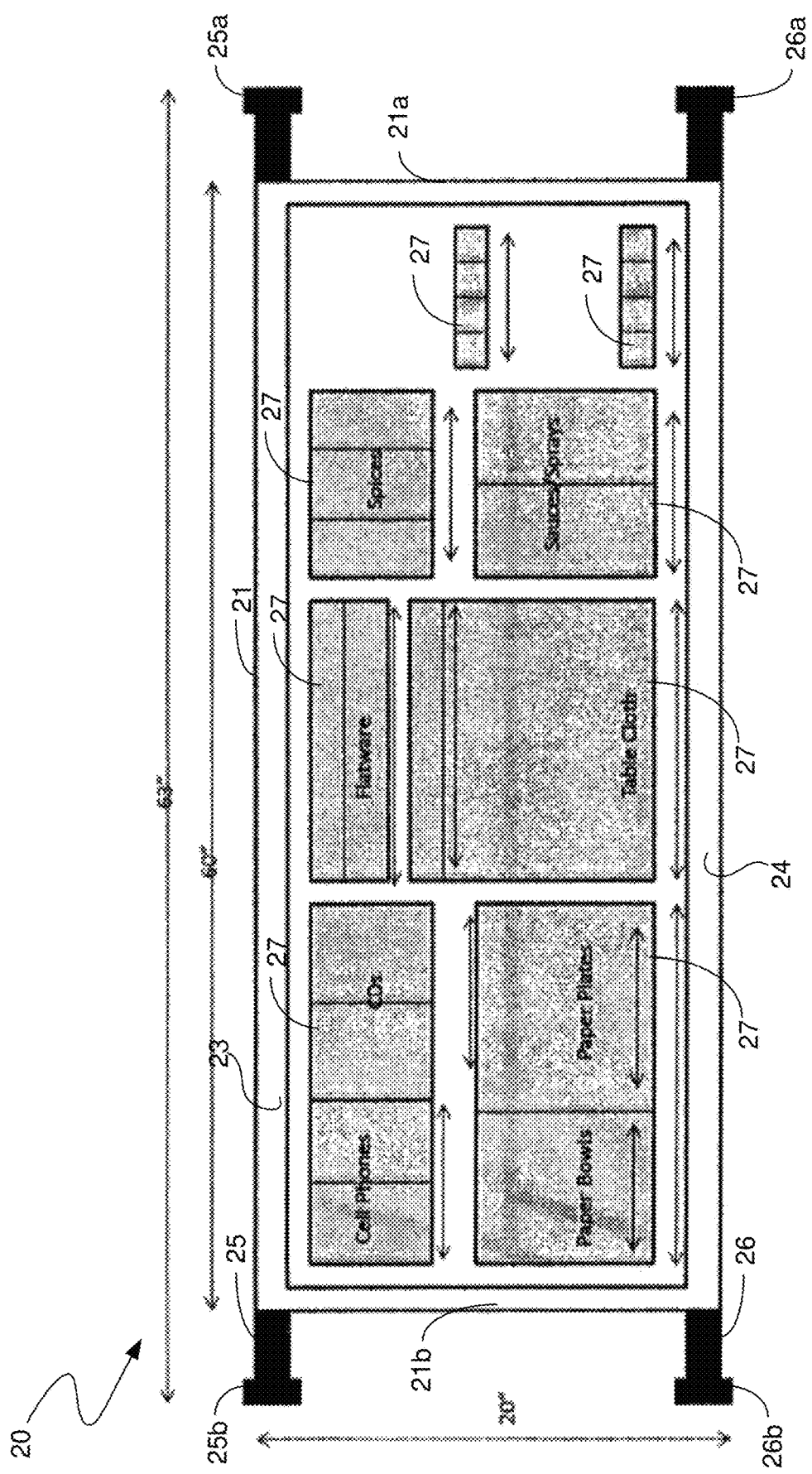
Figure 5:
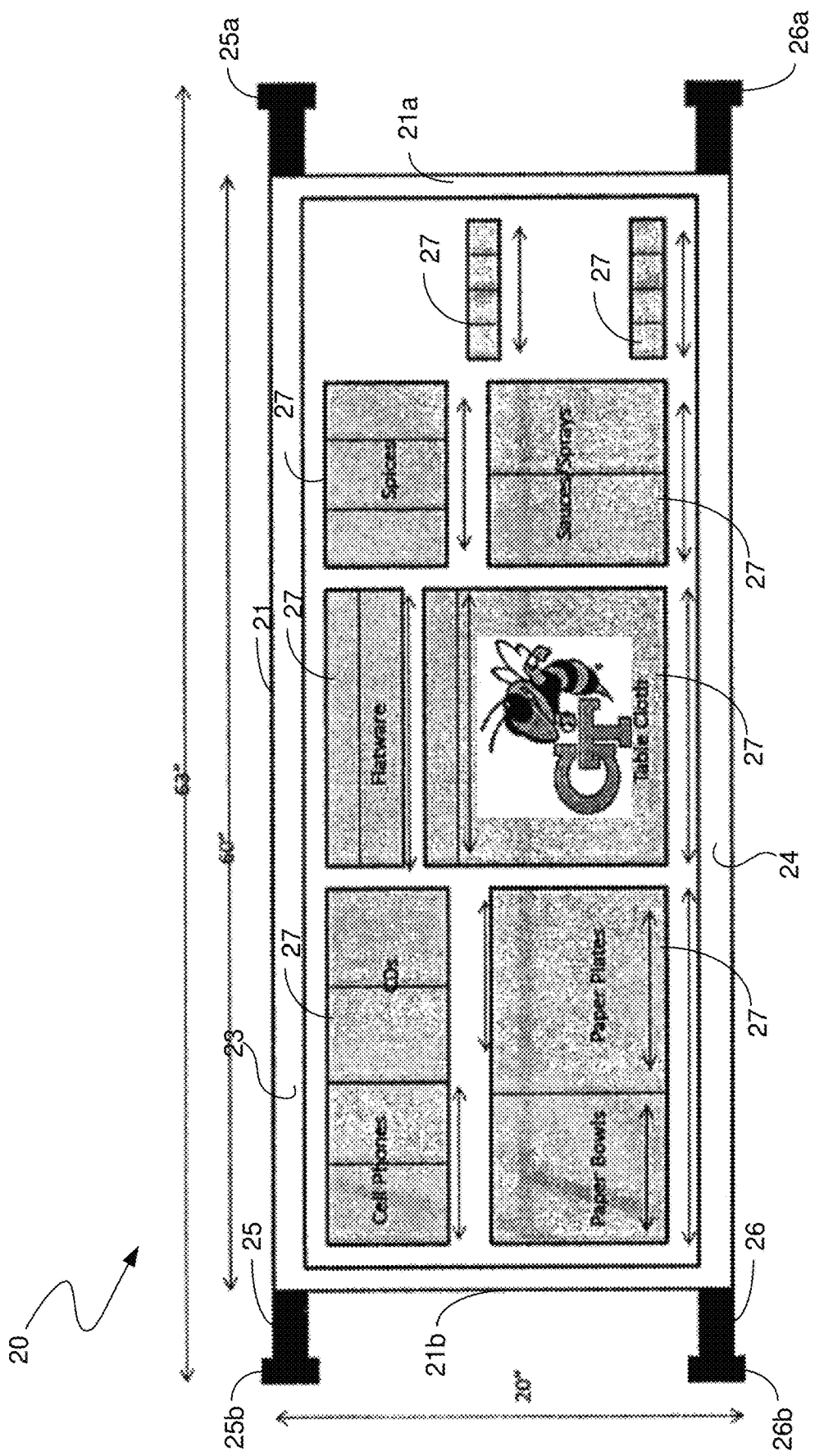
FIG. 5 illustrates a front plan view of the adjustable cargo organizer shown in FIG. 4 having a college or university logo thereon.

FIG. 4 illustrates a front plan view of the adjustable cargo organizer 20 in accordance with a representative embodiment in which the organizer 20 is designed for tailgates, picnics and the like. FIG. 5 illustrates a front plan view of the adjustable cargo organizer 20 shown in FIG. 4 having a college or university logo thereon. In this example embodiment of the organizer 20, the organizer 20 comprises a single (main) panel 21 of 14-ounce (oz.) cotton duck canvas that is about 60 inches in length and about 20 inches in width. The organizer 20 is formed by starting with a 60-inch-long-by-46-inch-wide rectangular canvas panel that is folded in half in the lengthwise direction and then seams are added running the length of the two longer edges of the panel 21. The main panel 21 incorporates two linear channels 23, 24 spanning the length of the single panel 21 at the top and bottom so that the channels 23, 24 are situated parallel at each terminating end 21a, 21b of the panel 21. These channels 23, 24 are about 3 inches in diameter when collapsed and when opened provide a mounting channel for the extendable 48-72-inch suspension rods 25, 26. The ends 25a, 25b of rod 25 and the ends 26a, 26b of rod 26 are disposed outside of the channels 23, 24 to make contact with whatever points on the external surface of the vehicle or other structure the organizer 20 is to be mounted on for use.

The main panel 21 comprises one or several cargo compartments 27 affixed to it using stitching with 20-oz thread. These compartments 27 can be used to store a number of singular or a plurality of items such as paper plates, spices, cellular phones, batteries, or first aid supplies. Compartments 27 can be affixed to the front, rear or both sides of the main panel 21 and to the individually sewn linear channels 23, 24. These compartments 27 can be secured with 14-oz sewn flaps utilizing hook-and-loop closures that serve to secure upper flaps or the affixed pockets. Alternately, buttons, snaps or other commercially available fastening devices can be used to secure or close the compartments 27.

In accordance with this example in which the organizer is designed for outdoor events such as tailgating or picnicking, for example, the compartments 27 have various shapes and sizes for holding specific types of items typically associated with such events and are labeled with corresponding labels, e.g., cell phones, CDs, flatware, spices, sauces, sprays, tablecloth, paper plates, paper bowls, etc.

The adjustable suspension rods 5, 6, 25, 26 can be made of any suitable material, including, for example, metal, nylon, PVC or other similar materials that provide rigidity and structural strength. The ends 5a, 5b, 6a, 6b, 25a, 25b, 26a, 26b can be endcaps that are affixed to the rods to create additional surface area and/or to improve gripping capability. In addition, permanent mounting fixtures can be added to the surface that is to couple with the endcaps to create a permanent mounting adaptation. Examples of suitable devices that can be secured to the ends of the rods are shown in the Appendix.

Figure 6:
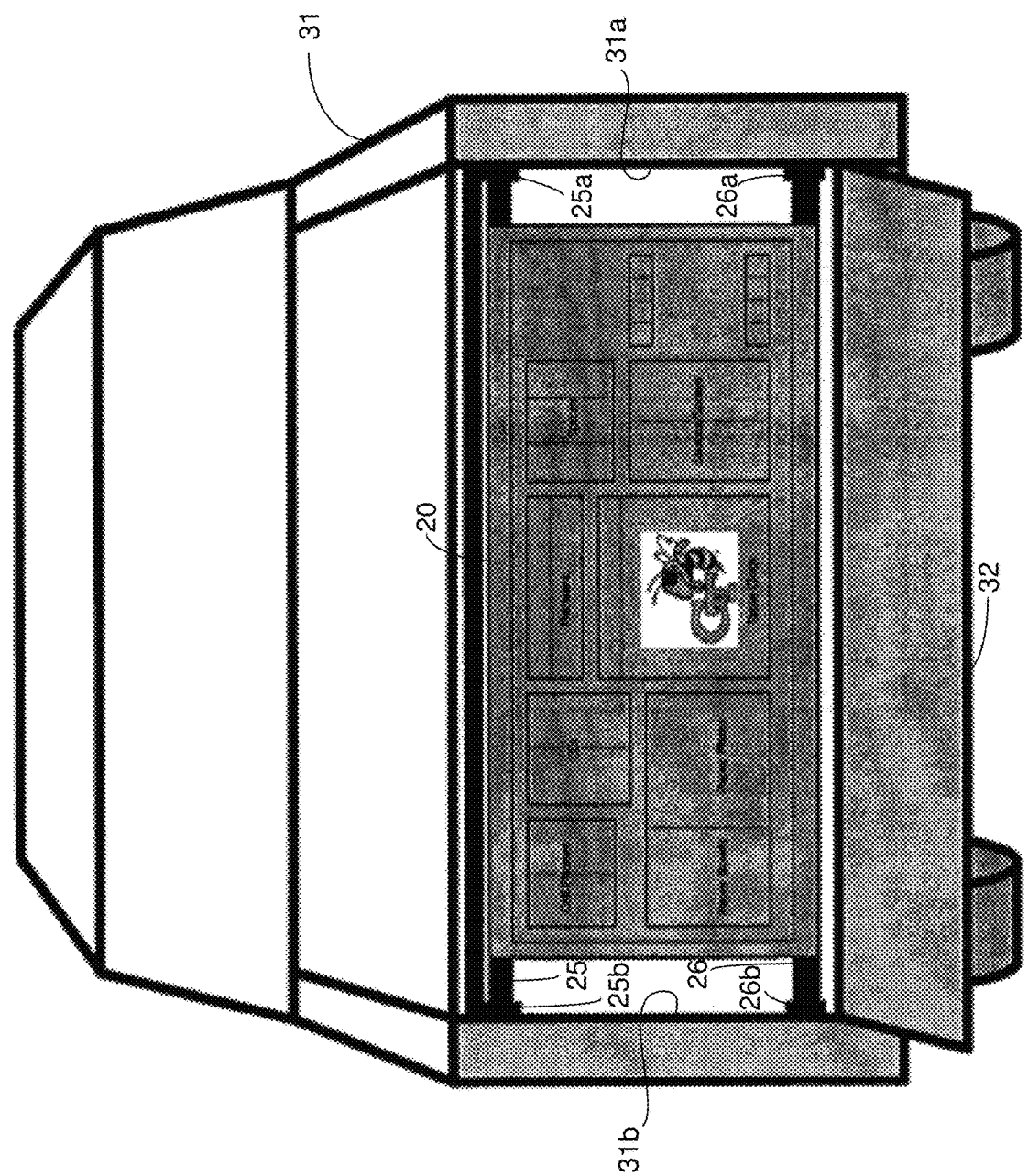
FIG. 6 illustrates a front plan view of the adjustable cargo organizer shown in FIG. 5 removably secured to the outside of a tailgate of a vehicle in accordance with a representative embodiment.

Recreational sports fans can use the device to pre-load, store, transport and utilize supplies and equipment during sporting events like tailgate parties. Plates, flatware, spices, phones, cups and other items can be stored for guest access and personal use. FIG. 6 illustrates a front plan view of the adjustable cargo organizer 20 shown in FIG. 5 removably secured to the external portions 31a and 31b of a tailgate area 32 of a vehicle 31 when the tailgate 32 is in the lowered or opened positions in accordance with a representative embodiment.

Fraternities and sororities can use the device to set up and operate charitable events in outdoor venues that prohibit nailing or use of damaging materials to suspend signs or other items from trees and structures. For example, the organizers 1, 20 can be suspended between two parked vehicles.

Hunters can use the organizer 1, 20 to attach and store hunting gear on trucks, offroad utility vehicles, deer blinds, shoot houses and boats.

Athletic trainers can use the organizer 1, 20 to transport equipment for training and during games to treat injuries.

Parents of student athletes can use the organizer 1, 20 to store coaching equipment, individual personal equipment and other items necessary to participation in sporting events.

EMS personnel can use the organizer 1, 20 to provide a rigid platform inside emergency vehicles to make access to critical care items like IV's, bandages, airway management systems and larger tools that cannot be carried on their person.

Fire rescue personnel can use the organizer 1, 20 to pre-load and stage emergency and rescue equipment closer to the access points of vehicles and even carry the organizer 1, 20 into structures and areas where it can be set up and used to provide faster access to larger and more complex equipment than they can carry on their person.

Police officers can suspend the organizer 1, 20 across the back of their SUV's during emergencies to provide quicker access to more ammunition, radio equipment, medical supplies, safety signaling equipment and other job critical supplies. Reflective strips and high visibility colors can be added to the organizer 1, 20 to increase visibility and reduce accidents during limited visibility. Officers can suspend the organizer 1, 20 between vehicles and access points to increase their ability to control crowds and limit access to restricted areas.

Military personnel can use the organizer 1, 20 inside armored vehicles or naval vessels for temporary storage and access to mission sensitive equipment that is normally carried or stored inside closed containers. When speed saves lives, the ability to access and deploy a tool or weapon can mean the difference between success and failure or life and death on today's modern battlefield. Combat engineers can load and transport explosives and mine detection equipment in the compartments for quick access. Clear pockets can be added to increase visibility and identification of items.

Because of its light weight and highly adaptable configuration, the organizer 1, 20 is well suited for space exploration because it can be used in zero gravity to effect solid working surfaces.

Hospital emergency workers can suspend the organizer 1, 20 between doorways and quickly access medically necessary supplies during heightened patient events or mass casualty situations. Labelling tabs can be affixed to the clear pockets of the organizer 1, 20 to identify specific types of emergency equipment needed in emergency room triage.

Lifeguards can use the organizer 1, 20 to store, transport and access life saving equipment on beaches and remote lakes.

Power company employees who work in inclement weather and dangerous conditions can use the organizer 1, 20 to store and access important tools and apparatus needed to perform their duties more safely and with less risk of injury.

Construction crews can use the organizer 1, 20 to store job specific tools such as, for example, hammers, squares, tape measures and nails at the rear of a vehicle or inside of a structure to allow them to be easily accessed and used without workers having to make multiple trips up and down ladders or into the outdoors, which reduces worker fatigue and injuries.

Figure 7:
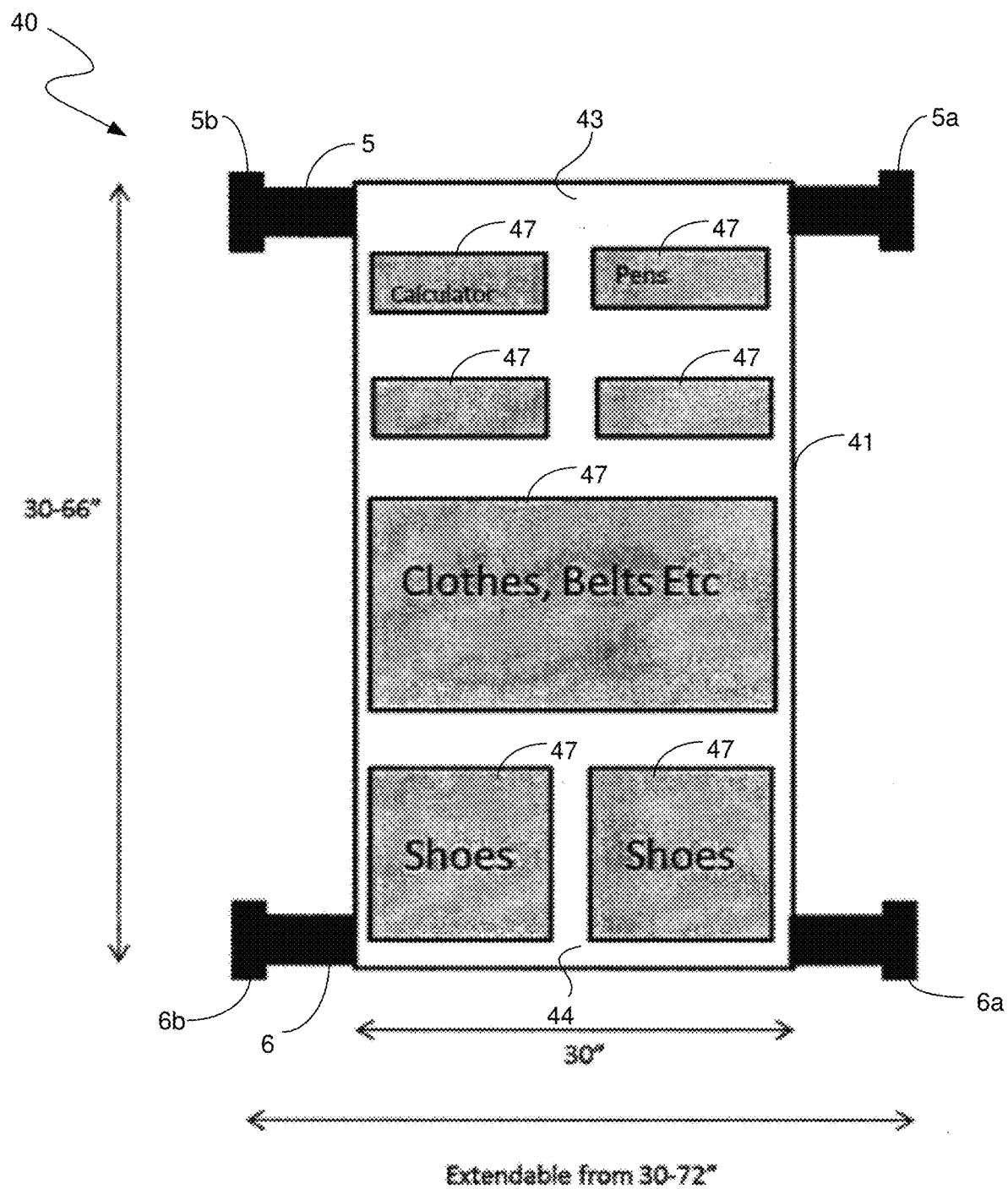
FIG. 7 illustrates a front plan view of the adjustable cargo organizer in accordance with a representative embodiment in which the organizer is adapted to be removably mounted between doorways or walls of a room of a building.

College students can suspend the organizer 1, 20 between the walls of dorm rooms and closets to organize books, lab materials, clothing and personal hygiene items. A vertically situated version of the organizer can be suspended between smaller doorways in cramped dorms for storage of snacks, clothing items, hair care products and fitness equipment. FIG. 7 illustrates a front plan view of the adjustable cargo organizer 40 in accordance with a representative embodiment in which the organizer 40 is adapted to be removably mounted between doorways or walls of a room of a building. The main panel 41 has upper and lower channels 43 and 44, respectively, through which the upper and lower rods 5 and 6, respectively, extend with outer ends 5*a*, 5*b* and 6*a*, 6*b* disposed at opposite sides of the panel 41 to make contact with the mounting surfaces. The panel 41 has multiple cargo compartments 47 for holding typical items for this type of environment.

Families can suspend the organizer 1, 20 40 across doorways or hallways to temporarily access holiday decorations, party supplies or cleaning supplies, as a pet gate or barrier, as a baby gate or barrier, etc.

Recreational vehicle owners can use the organizer 1, 20, 40 to maximize the limited space available by storing maintenance items or recreational toys and equipment for ease of access while stopped to camp or clean.

Apartment residents can use the organizer 1, 20, 40 to add storage to small outdoor utilities where lease agreements prohibit permanent fixtures. The organizer 1, 20, 40 can also be used to provide temporary privacy from nosy neighbors.

Municipalities can use the organizer 1, 20, 40 for distribution of voter information and to provide sundry items to citizens effected by natural disasters.

Governmental agencies can use the organizer 1, 20, 40 to provide a stable platform for distribution of literature and supplies for low income and disadvantaged persons during times of economic distress and national emergencies, such as the attacks of Sep. 11, 2001 and the Olympic bombing in Atlanta in 1996.

Photographers and make-up artists can use the organizer 1, 20, 40 to provide props and photographic equipment to remote shooting locations and to allow easy accessibility.

Event Planners can set up the organizer 1, 20, 40 out of view from guests and access important equipment for time sensitive displays, etc.

Houses of worship can use the organizer 1, 20, 40 to hold services in remote or outdoor locations.

Restaurants and food trucks can use the organizer 1, 20, 40 to set up temporary serving stations at outdoor events.

In-home nursing, rehabilitative care, palliative care and physical therapy professionals can use the organizer 1, 20, 40 to transport and make available equipment for in-home care and services.

Additional exemplary embodiments can include the following:

1. A plurality of rods, slats or rigid panels can be affixed to or disposed inside of the main panel section to add further rigidity and support.
2. Pocket flaps with zippers, buttons, or hook and loop closures can be added to prevent items from falling out of the compartments.
3. Additional suspension rods can be added to the upper and lower channels to substantially increase the weight bearing capacity and main panel rigidity.
4. Sections of hook and loop closures can be added to the rods and the inner suspension rod channels to further secure the panels to the rods to add stability and prevent slippage.
5. Grommets can be added to the main panel section in various locations to allow support ropes to secure two or more main panel sections together.
6. Various types of straps can be attached to the organizer 1, 20, 40 allowing it to be rolled up, folded and secured for carrying in a tote bag or backpack configuration.

7. Permanently affixed suspension rod mounting supports are currently commercially available and could be used for permanent attachment.
8. Clear or transparent pocket material can be used to make pockets transparent for ease of item identification and in low light conditions.
9. Military grade ballistic nylon or flame retardant material can be used to provide added durability and protection for military, aviation, and law enforcement use.
10. Additional storage compartments can be added to the suspension rod channels to secure items.
11. The main panel section can be made of a plurality of layers of material to add strength and durability.
12. The use of a multi-layer main section panel can allow for internal compartments to be added to the inner layers in various configurations.
13. Various reflective materials, lighting devices, and main panel section colors can be used to provide increased visibility in emergency situations.
14. Removable storage compartments can be affixed with various attachment methods allowing greater customization of the storage compartments.
15. Solar panels can be affixed to or incorporated into the main panel section and corresponding electrical wiring can be used to allow the organizer 1, 20, 40 to be used as a charging or power station for portable electronic devices.
16. Technological advancements in electronics, chemistry, solar power, nanotechnology and other fields of science may make additional uses possible.

The upper and lower suspension rods can be adjusted inward or outward to increase or decrease the rod length allowing for the rods to be placed so that they exert outward force on both walls of a rigid structure like a truck bed wall or the walls of a closet in a house. Suspension rods are already commercially available and are used in many homes that have showers. In general, they often are comprised of five parts.

Suspension rods can be made by, for example, inserting a spring inside a hollow metal tube that is crimped on one end and open on the opposite. A second hollow tube of metal is then inserted into the first tube encasing the spring. The second tube usually has a small indention that guides the spring and prevents it from reversing once it is advanced. The apparatus can be completed by the addition of a rubber or plastic end cap to the end of the suspension rods to provide grip or tackiness to the ends of the suspension rods when they are mounted against as solid surface (see, for example, U.S. Pat. Nos. 6,651,831 B2 and 8,215,501 B2).

The organizer reduces the installation time, negates the need for permanently mounted hardware, allows portability from one vehicle/structure to another, and reduces permanent scarring or marking of vehicle/structure surfaces, which aids in retention of resale value.

It should be noted that although FIGS. 4, 5 and 7 show examples of dimensions for the elements of the cargo carrier and for the cargo carrier itself, the dimensions shown are merely exemplary and are not intended to be the only possible dimensions. It should be noted that although FIGS. 1-7 show examples of shapes for the elements of the cargo carrier and for the cargo carrier itself, the shapes shown are merely exemplary and are not intended to be the only possible shapes.

Although the present disclosure describes several representative embodiments, they should not be construed as limitations on the scope of the inventive principles and concepts, but rather, as examples provided to enhance understanding of the inventive principles and concepts. The scope of the disclosure should be determined based on the appended claims rather than these examples.

What is claimed is:

1. An adjustable cargo organizer comprising:
   a main panel, the main panel having at least first and second suspension rod channels formed along first and second opposing sides of the main panel, the first and second channels being substantially parallel to one another and substantially parallel to the first and second sides of the main panel, respectively;
   a plurality of cargo compartments secured to or formed in the main panel, each cargo compartment being sized and shaped to receive and temporarily hold one or more cargo items; and
   first and second suspension rods extending through the first and second channels, respectively, such that opposite ends of the suspension rods are disposed outside of opposite ends of the respective channels for removably coupling the first and second suspension rods to first and second portions of a vehicle or structure, wherein the main panel extends substantially vertically between the first and second suspension rods.

2. The cargo organizer of claim 1, wherein each of the suspension rods is adjustable in length.

3. The cargo organizer of claim 2, wherein each of the suspension rods comprises a spring-assisted tension rod, wherein each spring-assisted tension rod is adjustable in length by applying a force that compresses the spring-assisted tension rod in the lengthwise direction of the rod to bring the ends of the rod closer together, and wherein a spring inside of the rod is compressed and loaded as the ends of the rod are brought closer together, and wherein removal of or a reduction of the force causes the spring to decompress to move the ends of the rod in opposite directions.

4. The cargo organizer of claim 2, wherein each of the suspension rods comprises a telescoping tension rod, wherein each telescoping tension rod is adjustable in length by depressing a locking pin to disengage the locking pin from a lock pin mating opening formed in the rod to place the rod in an unlocked state in which a spring inside of the rod bias the ends of the rod in opposite directions and then allowing the locking pin to engage a different lock pin mating opening formed in the rod.

5. The cargo organizer of claim 2, wherein each of the suspension rods comprises first and second rod sections that are secured to one another by a length-setting coupling arrangement, wherein each rod section is adjustable in length by removing or loosening the length-setting coupling arrangement to allow a spring of the rod to bias the ends of the rod sections in opposite directions until the rod is at a desired length and then tightening the length-setting coupling arrangement.

6. The cargo organizer of claim 1, wherein each end of each of the rods has a flexible end piece secured thereto that comes into contact with the portion of the vehicle or structure to which the respective end is removably coupled.

7. The cargo organizer of claim 1, wherein the main panel has one or more openings extending between front and back sides of the main panel, each opening being fitted with an eyelet grommet.

8. The cargo organizer of claim 1, wherein at least a first cargo compartment of said plurality of cargo compartments includes a fastening mechanism that can be fastened to close the cargo compartment and unfastened to open the cargo compartment.

9. The cargo organizer of claim 8, wherein the fastening mechanism comprises a pocket flap with a zipper mechanism for fastening an edge of the pocket flap to a front portion of the first cargo compartment.

10. The cargo organizer of claim 8, wherein the fastening mechanism comprises a snap fastening mechanism.

11. The cargo organizer of claim 8, wherein the fastening mechanism comprises a pocket flap with a hook and loop fastener having a portion disposed on an edge of the pocket flap and a portion disposed on a front portion of the first cargo compartment.

12. The cargo organizer of claim 8, wherein the fastening mechanism comprises a pocket flap and a button fastener arrangement, the button fastener arrangement comprising a button secured to one of the pocket flap and a front portion of the first cargo compartment and an opening formed in one of the pocket flap and the front portion of the first cargo compartment for engaging with the button.

13. The cargo organizer of claim 8, wherein at least a first cargo compartment of said plurality of cargo compartments is clear or translucent to allow contents held within the first cargo compartment to be visible to a user of the adjustable cargo organizer.

14. The cargo organizer of claim 8, wherein at least a first cargo compartment of said plurality of cargo compartments is secured to a front side of the main panel and at least a second cargo compartment of said plurality of cargo compartments is secured to a back side of the main panel, the front side of the main panel being opposite the back side of the main panel.

15. The cargo organizer of claim 1, wherein the main panel is made from a material comprising at least one of canvas, nylon, polyester, acrylic, plastic, leather and cloth.

16. The cargo organizer of claim 1, wherein said first and second portions of a vehicle or structure are first and second sides, respectively, of a tailgate area of a vehicle.

17. The cargo organizer of claim 1, wherein said first and second portions of a vehicle or structure are first and second sides, respectively, of a doorway of a structure.

18. An adjustable cargo organizer comprising:
a main panel, the main panel having at least top and bottom suspension rod channels formed along top and bottom opposing sides, respectively, of the main panel, the top and bottom channels being substantially parallel to one another and substantially parallel to the top and bottom sides of the main panel, respectively;
a plurality of cargo compartments secured to or formed in the main panel, each cargo compartment being sized and shaped to receive and temporarily hold one or more cargo items; and
top and bottom suspension rods extending through the top and bottom channels, respectively, such that opposite ends of the suspension rods are disposed outside of opposite ends of the respective channels for removably coupling the top and bottom suspension rods to first and second portions of a vehicle or structure, each of the suspension rods being adjustable in length to accommodate different distances between said first and second portions of a vehicle or structure, wherein the main panel extends substantially vertically between the top and bottom suspension rods.

* * * * *